United States Patent
Ryu et al.

(10) Patent No.: US 9,863,340 B2
(45) Date of Patent: Jan. 9, 2018

(54) SYSTEM AND METHOD FOR CONTROLLING OF VALVE TIMING OF CONTINUOUS VARIABLE VALVE DURATION ENGINE

(71) Applicant: Hyundai Motor Company, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/372,152

(22) Filed: Dec. 7, 2016

(65) Prior Publication Data

US 2017/0167414 A1   Jun. 15, 2017

(30) Foreign Application Priority Data

Dec. 11, 2015   (KR) .......................... 10-2015-0177482

(51) Int. Cl.
*F02D 13/04* (2006.01)
*F02D 41/00* (2006.01)
(Continued)

(52) U.S. Cl.
CPC .......... *F02D 41/0007* (2013.01); *F02B 37/00* (2013.01); *F02D 13/0207* (2013.01);
(Continued)

(58) Field of Classification Search
CPC ............ F02D 13/0207; F02D 13/0242; F02D 13/0246; F02D 2041/001; F02D 9/04;
(Continued)

(56) References Cited

U.S. PATENT DOCUMENTS

| 5,161,497 A | 11/1992 | Simko et al. |
| 2017/0167318 A1* | 6/2017 | Ryu .................... F01L 13/0015 |

(Continued)

FOREIGN PATENT DOCUMENTS

| JP | 07-042514 A | 2/1995 |
| JP | 2010-216464 A | 9/2010 |
| KR | 10-0321206 B1 | 5/2002 |
| KR | 10-2009-0013007 A | 2/2009 |

*Primary Examiner* — John Kwon
(74) *Attorney, Agent, or Firm* — Morgan, Lewis & Bockius LLP

(57) ABSTRACT

A method for controlling valve timing of a turbo engine may include classifying a plurality of control regions depending on an engine load and an engine speed, applying a maximum duration to an intake valve and controlling a valve overlap between an exhaust valve and the intake valve in a first control region, maintaining the maximum duration of the intake valve in a second control region, advancing an intake valve closing (IVC) timing and an exhaust valve closing (EVC) timing in a third control region, controlling the IVC timing to be close to bottom dead center (BDC) in a fourth control region, controlling a throttle valve to be fully opened and retarding an exhaust valve opening (EVO) timing in a fifth control region, and controlling the throttle valve to be fully opened and controlling the IVC timing to prevent knocking in a sixth control region.

14 Claims, 6 Drawing Sheets

(51) Int. Cl.
  *F02B 37/00*   (2006.01)
  *F02D 13/02*   (2006.01)
  *F02D 41/02*   (2006.01)
  *F02D 41/26*   (2006.01)

(52) U.S. Cl.
  CPC ..... *F02D 13/0261* (2013.01); *F02D 41/0235* (2013.01); *F02D 41/26* (2013.01); *F02D 2041/001* (2013.01); *F02D 2041/002* (2013.01); *F02D 2200/101* (2013.01); *F02D 2200/1002* (2013.01)

(58) Field of Classification Search
  CPC ............. F02D 13/0226; F02D 13/0257; F02D 13/0261; F02D 13/0284; F02D 13/023; F01L 13/065; F01L 13/0015
  USPC .................................. 123/321–323, 345–348
  See application file for complete search history.

(56) References Cited

U.S. PATENT DOCUMENTS

| | | | |
|---|---|---|---|
| 2017/0167393 A1* | 6/2017 | Ryu | ........................ F02D 41/26 |
| 2017/0167394 A1* | 6/2017 | Ryu | ..................... F02D 13/0215 |
| 2017/0167396 A1* | 6/2017 | Ryu | ................... F02D 41/0002 |
| 2017/0167399 A1* | 6/2017 | Ryu | ..................... F02D 13/0215 |
| 2017/0167401 A1* | 6/2017 | Ryu | ........................... F01L 1/34 |
| 2017/0167402 A1* | 6/2017 | Ryu | ...................... B60W 20/10 |
| 2017/0167403 A1* | 6/2017 | Ryu | ...................... B60W 10/06 |
| 2017/0167404 A1* | 6/2017 | Ryu | ..................... F02D 13/0215 |
| 2017/0167405 A1* | 6/2017 | Ryu | ....................... F01L 13/0015 |
| 2017/0167406 A1* | 6/2017 | Ryu | ........................... F01L 1/34 |
| 2017/0234243 A1* | 8/2017 | Ryu | ................... F02D 13/0207 123/350 |

\* cited by examiner

SYSTEM AND METHOD FOR CONTROLLING OF VALVE TIMING OF CONTINUOUS VARIABLE VALVE DURATION ENGINE

CROSS-REFERENCE TO RELATED APPLICATION

The present application claims priority to Korean Patent Application No. 10-2015-0177482, filed Dec. 11, 2015, the entire contents of which is incorporated herein for all purposes by this reference.

BACKGROUND OF THE INVENTION

Field of the Invention

The present invention relates to a system and a method for controlling valve timing of a continuous variable valve duration engine. More particularly, to a system and a method for controlling valve timing of a continuous variable valve duration engine that simultaneously controls duration and timing of the continuous variable valve by mounting a continuous variable valve duration device on an intake and mounting a continuous variable valve duration device and a continuous variable valve timing device on an exhaust in a turbo engine.

Description of Related Art

An internal combustion engine combusts mixed gas in which fuel and air are mixed at a predetermined ratio through a set ignition mode to generate power by using explosion pressure.

In this case, a camshaft is driven by a timing belt connected with a crankshaft that converts linear motion of a cylinder by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

In the operations of the intake valve and the exhaust valve, only when a valve lift and a valve opening/closing time (timing) are controlled according to a rotational speed or load of an engine can optimal engine performance be secured. Therefore, a continuous variable valve duration (CVVD) device controlling an opening time of an intake valve and an exhaust valve of the engine and a continuous variable valve timing (CVVT) device controlling opening and closing timing of the intake valve and the exhaust valve of the engine have been developed.

The CVVD device adjusts duration of the valve. In addition, the CVVT device advances or retards opening and closing timing of the valve in a state in which the duration of the valve is fixed. In other words, when the opening timing of the valve is determined, the closing timing is automatically determined according to the duration of the valve.

However, in a case of combusting the CVVD device and the CVVT device, duration and timing of the valve should be simultaneously controlled.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method for controlling valve timing of a continuous variable valve duration engine having advantages of simultaneously controlling duration and timing of the continuous variable valve by mounting a continuous variable valve duration device on an intake and mounting a continuous variable valve duration device and a continuous variable valve timing device on an exhaust in a turbo engine.

According to various aspects of the present invention, a method for controlling valve timing of a turbo engine provided with a continuous variable valve duration (CVVD) device at an intake and a continuous variable valve duration (CVVD) device and a continuous variable valve timing (CVVT) device at an exhaust may include classifying, by a controller, a plurality of control regions depending on an engine load and an engine speed, applying, by the controller, a maximum duration to an intake valve and controlling a valve overlap between an exhaust valve and the intake valve in a first control region, maintaining, by the controller, the maximum duration of the intake valve in a second control region, advancing, by the controller, an intake valve closing (IVC) timing and an exhaust valve closing (EVC) timing in a third control region, controlling, by the controller, the IVC timing to be close to bottom dead center (BDC) in a fourth control region, controlling, by the controller, a throttle valve to be fully opened and retarding an exhaust valve opening (EVO) timing in a fifth control region, and controlling, by the controller, the throttle valve to be fully opened and controlling the IVC timing to prevent knocking in a sixth control region.

The EVC timing may be set as a maximum value for maintaining combustion stability in the first control region.

A maximum duration may be applied to the exhaust valve by retarding the EVC timing according to an increase of the engine load in the second control region.

The IVC timing may be advanced to be close to BDC when the engine speed is less than a predetermined speed and the IVC timing may be advanced to an angle after BDC when the engine speed is equal to or greater than the predetermined speed in the third control region.

The IVC timing may be controlled to be closed to BDC and the EVC timing may be controlled to be close to top dead center (TDC) in the fourth control region.

The EVO timing may be retarded after BDC and the EVC timing may be controlled to an angle after top dead center (TDC) to maintain catalyst temperature within a predetermined range in the fifth control region.

The EVO timing may be advanced and the EVC timing may be controlled to be close to top dead center (TDC) in the sixth control region.

According to various aspects of the present invention, a system for controlling valve timing of a continuous variable valve duration engine including a turbocharger may include a data detector detecting data related to a running state of a vehicle, a camshaft position sensor detecting a position of a camshaft, an intake continuous variable valve duration (CVVD) device controlling an opening time of an intake valve of the engine, an exhaust continuous variable valve duration (CVVD) device controlling an opening time of an exhaust valve of the engine, an exhaust continuous variable valve timing (CVVT) device controlling an opening timing and closing timing of the exhaust valve, and a controller classifying a plurality of control regions depending on an engine speed and an engine load based on signals received by the controller from the data detector and the camshaft position sensor, and controlling operations of the intake CVVD device and the exhaust CVVD device, and the exhaust CVVT device according to the control regions, in which the controller may apply a maximum duration to the intake valve and control a valve overlap between the exhaust valve and the intake valve in a first control region, maintain the maximum duration of the intake valve in a second control region, advance an intake valve closing (IVC) timing and an exhaust valve closing (EVC) timing in a third control region, control the IVC timing to be close to bottom dead center (BDC) in a fourth control region, control a throttle valve to be fully opened and retards an exhaust valve opening (EVO) timing in a fifth control region, and control the throttle valve to be fully opened and control the IVC timing to prevent knocking in a sixth control region.

The controller may set the EVC timing as a maximum value capable of maintaining combustion stability in the first control region.

The controller may apply a maximum duration to the exhaust valve by retarding the EVC timing according to an increase of the engine load in the second control region.

The controller may advance the IVC timing to be close to BDC when the engine speed is less than a predetermined speed and advance the IVC timing to an angle after BDC when the engine speed is equal to or greater than the predetermined speed in the third control region.

The controller may control the IVC timing to be close to BDC and control the EVC timing to be close to top dead center (TDC) in the fourth control region.

The controller may retard the EVO timing after BDC and control the EVC timing to an angle after top dead center (TDC) to maintain catalyst temperature within a predetermined range in the fifth control region.

The controller may advance the EVO timing and control the EVC timing to be close to top dead center (TDC) in the sixth control region.

According to various embodiments of the present invention, duration and timing of the continuous variable valve are simultaneously controlled, so the engine may be controlled under optimum conditions.

Opening timing and closing timing of the intake valve and the exhaust valve are optimally controlled, thereby improving fuel efficiency under a partial load condition and power performance under a high load condition. In addition, a fuel amount for starting may be reduced by increasing a valid compression ratio, and exhaust gas may be reduced by shortening time for heating a catalyst.

Further, since a continuous variable valve timing device at the intake is omitted, production cost may be reduced while maintaining power performance.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Additionally, it is understood that some of the methods of various embodiments of the present invention may be executed by at least one controller. The term controller referred to a hardware device that includes a memory and a processor configured to executed one or more steps that should be interpreted as its algorithmic structure. The memory is configured to store algorithmic steps, and the processor is specifically configured to executed said algorithmic steps to perform one or more processes which are described further below.

Furthermore, the control logic of various embodiments of the present invention may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics or a controller area network (CAN).

Figure 1:
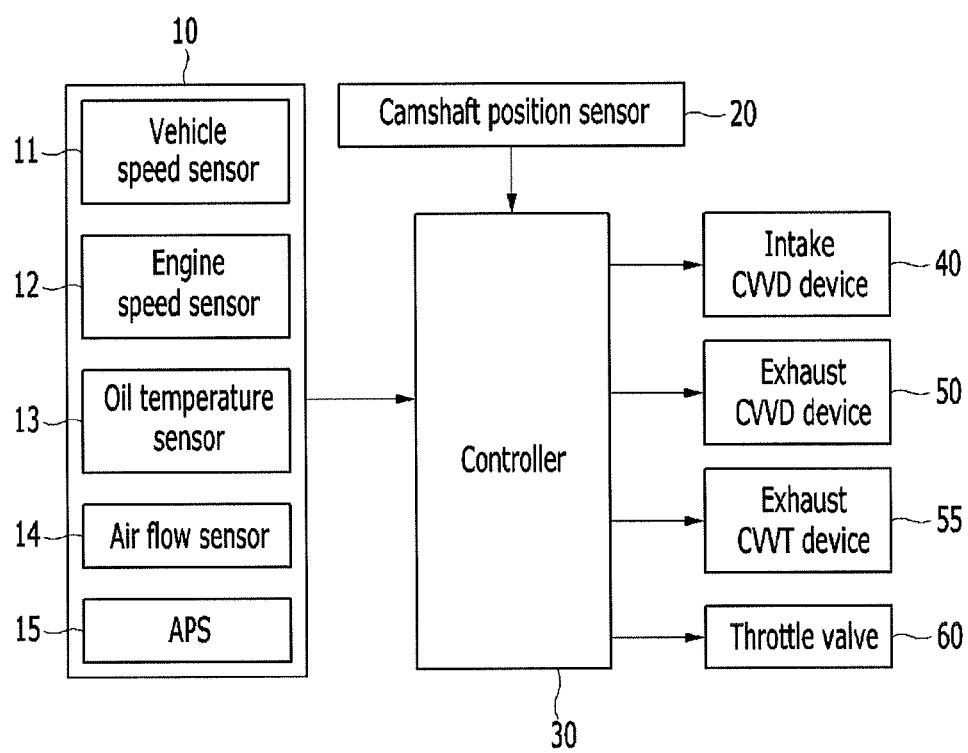
FIG. 1 is a schematic block diagram showing a system for controlling valve timing of a continuous variable valve duration engine according to various embodiments of the present invention.

FIG. 1 is a schematic block diagram showing a system for controlling valve timing of a continuous variable valve duration engine according to various embodiments of the present invention.

In various embodiments of the present invention, the engine as a power source of a vehicle is a turbo engine that includes a turbocharger.

As shown in FIG. 1, a system for controlling valve timing of a continuous variable valve duration engine according to various embodiments of the present invention includes a data detector 10, a camshaft position sensor 20, a controller 30, an intake continuous variable valve duration (CVVD) device 40, an exhaust continuous variable valve duration (CVVD) device 50, and an exhaust continuous variable valve timing (CVVT) device 55, and a throttle valve 60.

The data detector 10 detects data related to a running state of the vehicle for controlling the CVVD devices and the CVVT device, and includes a vehicle speed sensor 11, an engine speed sensor 12, an oil temperature sensor 13, an air flow sensor 14, and an accelerator pedal position sensor 15.

The vehicle speed sensor 11 detects a vehicle speed, and transmits a signal corresponding thereto to the controller 30. The vehicle speed sensor 11 may be mounted at a wheel of the vehicle.

The engine speed sensor 12 detects an engine speed from a change in phase of a crankshaft or camshaft, and transmits a signal corresponding thereto to the controller 30.

The oil temperature sensor (OTS) 13 detects temperature of oil flowing through an control valve (OCV), and transmits a signal corresponding thereto to the controller 30.

The oil temperature detected by the oil temperature sensor 13 may be determined by determining a coolant temperature using a coolant temperature sensor mounted at a coolant passage of an intake manifold. Therefore, in this specification and the scope of the appended claims, the oil temperature sensor 13 may include the coolant temperature sensor, and the oil temperature should be understood to be the coolant temperature.

The air flow sensor 14 detects an air amount flowing into the intake manifold, and transmits a signal corresponding thereto to the controller 30.

The accelerator pedal position sensor 15 detects a degree at which a driver pushes an accelerator pedal, and transmits a signal corresponding thereto to the controller 30. The position value of the accelerator pedal is 100% when the accelerator pedal is pressed fully, and the position value of the accelerator pedal is 0% when the accelerator pedal is not pressed at all.

A throttle valve position sensor that is mounted on an intake passage may be used instead of the accelerator pedal position sensor 15. Therefore, in this specification and the scope of the appended claims, the accelerator pedal position sensor 15 may include the throttle valve position sensor, and the position value of the accelerator pedal should be understood to be an opening value of the throttle valve.

The camshaft position sensor 20 detects a position of a camshaft angle, and transmits a signal corresponding thereto to the controller 30.

Figure 2:
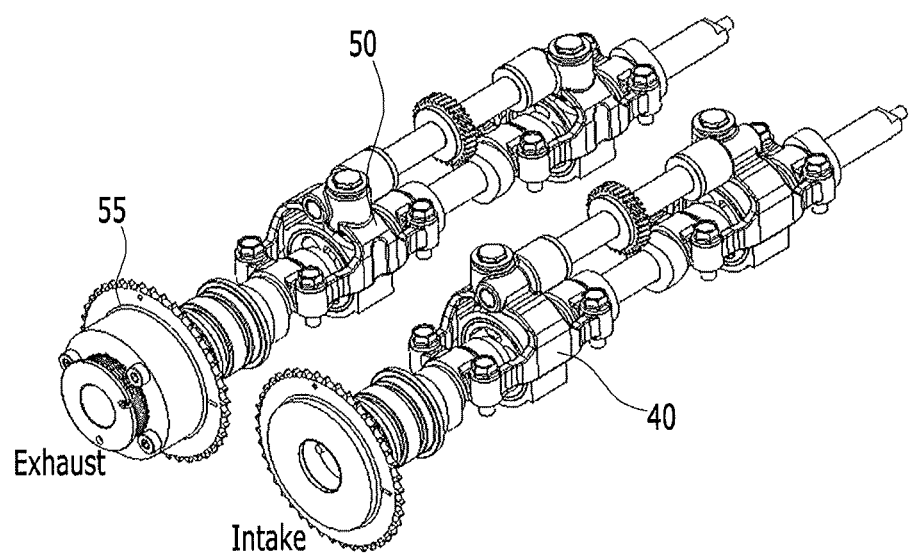
FIG. 2 is a perspective view showing an intake provided with a continuous variable valve duration device and an exhaust provided with a continuous variable valve duration device and a continuous variable valve timing device according to various embodiments of the present invention.

FIG. 2 is a perspective view showing an intake provided with a continuous variable valve duration device and an exhaust provided with a continuous variable valve duration device and a continuous variable valve timing device according to various embodiments of the present invention. As shown in FIG. 2, the continuous variable valve duration device is mounted on the intake and the continuous variable valve duration device and the continuous variable valve timing device are mounted on the exhaust. Therefore, an intake valve opening timing (IVO) is fixed in various embodiments of the present invention. For example, the IVO timing may be fixed at an angle of 0 to 10 degrees before top dead center (TDC) so as to be advantageous in terms of fuel efficiency.

The intake continuous variable valve duration (CVVD) device 40 controls opening time (duration) of the intake valve of the engine according to a signal from the controller 30, and the exhaust continuous variable valve duration (CVVD) device 50 controls opening time (duration) of the exhaust valve of the engine according to a signal from the controller 30.

The exhaust continuous variable valve timing (CVVT) device 55 controls opening timing and closing timing of the exhaust valve of the engine according to a signal from the controller 30.

The throttle valve 60 adjusts the air amount flowing into the intake manifold.

The controller 30 classifies a plurality of control regions depending on an engine speed and an engine load based on signals of the data detector 10 and the camshaft position sensor 20, and controls operations of the intake CVVD device 40, the exhaust CVVD device 50, the exhaust CVVT device 55, and the throttle valve 60. Herein, the plurality of control regions may be classified into six regions.

The controller 30 applies a maximum duration to the intake valve and controls a valve overlap between the exhaust valve and the intake valve in a first control region, maintains the maximum duration of the intake valve in a second control region, advances an intake valve closing (IVC) timing and an exhaust valve closing (EVC) timing in a third control region, controls the IVC timing to be close to bottom dead center (BDC) in a fourth control region, controls the throttle valve to be fully opened and retards an exhaust valve opening (EVO) timing in a fifth control region, and controls the throttle valve to be fully opened and controls the IVC timing to prevent knocking in a sixth control region.

For these purposes, the controller 30 may be implemented with at least one processor executed by a predetermined program, and the predetermined program may programmed in order to perform each step of a method for controlling valve timing of a continuous variable valve duration engine according to various embodiments of the present invention.

Various embodiments described herein may be implemented within a recording medium that may be read by a computer or a similar device by using software, hardware, or a combination thereof, for example.

According to hardware implementation, the various embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform any other functions.

According to software implementation, embodiments such as procedures and functions described in various embodiments of the present embodiments may be implemented by separate software modules. Each of the software modules may perform one or more functions and operations described in various embodiments of the present invention. A software code may be implemented by a software application written in an appropriate program language.

Hereinafter, a method for controlling valve timing of a continuous variable valve duration engine according to various embodiments of the present invention will be described in detail with reference to FIG. 3 to FIG. 5.

Figure 3A:
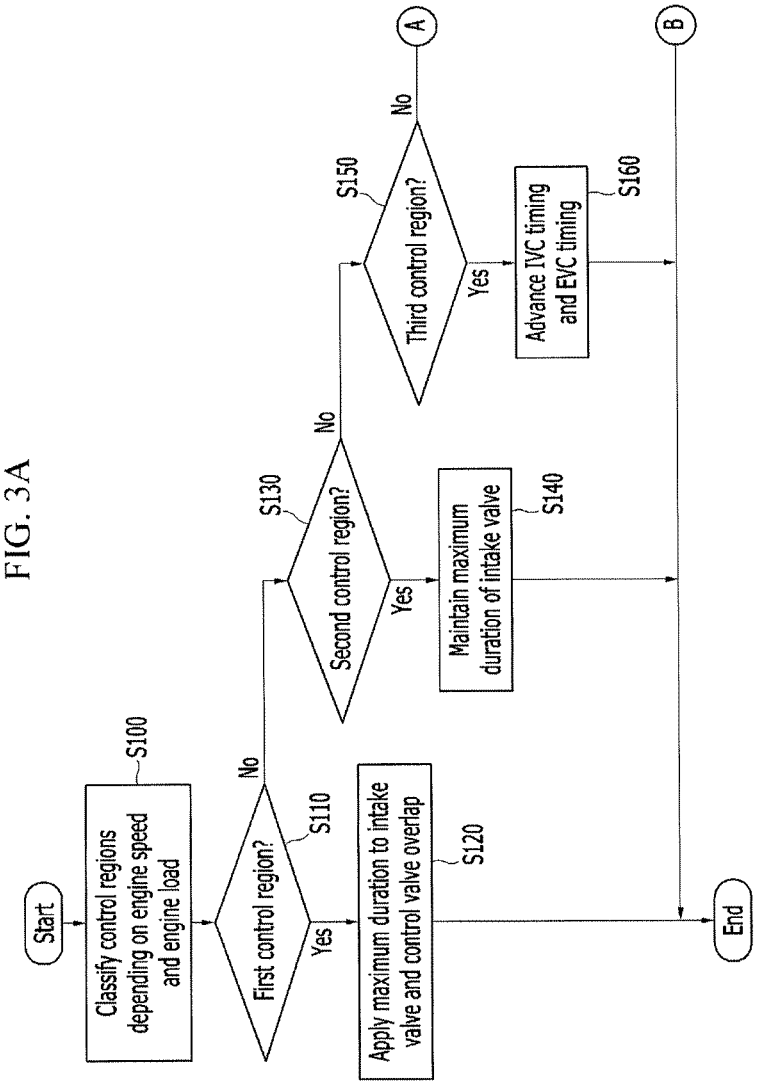
FIG. 3A and FIG. 3B are flowcharts showing methods for controlling valve timing of a continuous variable valve duration engine according to various embodiments of the present invention.
Figure 3B:
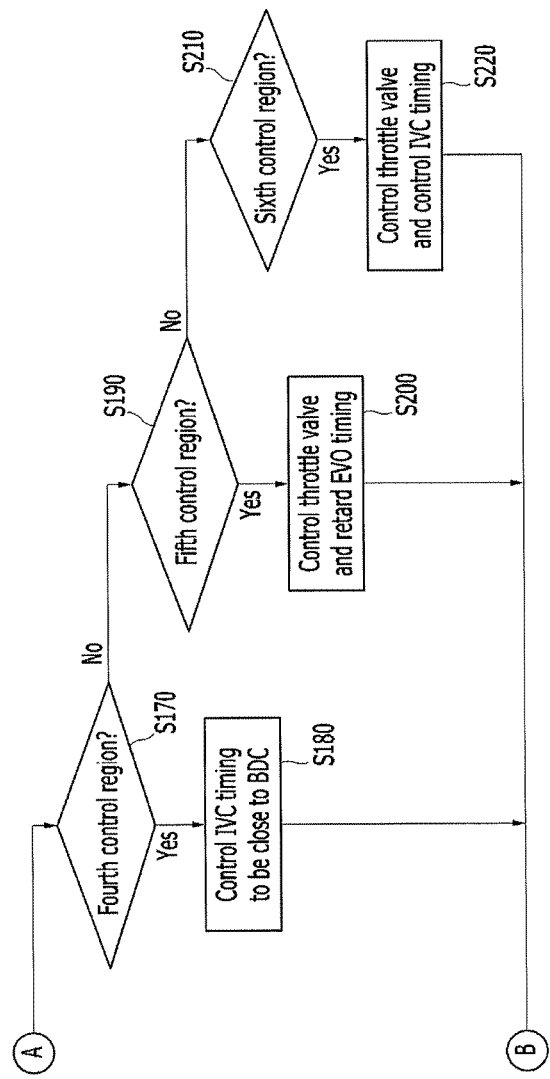

FIG. 3 is a flowchart showing a method for controlling valve timing of a continuous variable valve duration engine according to various embodiments of the present invention. FIG. 4 is a graph showing duration, opening timing, and closing timing of an intake valve depending on an engine load and an engine speed according to various embodiments of the present invention, and FIG. 5 is a graph showing duration, opening timing, and closing timing of an exhaust valve depending on an engine load and an engine speed according to various embodiments of the present invention.

As shown in FIG. 3, a method for controlling valve timing of a continuous variable valve duration engine according to various embodiments of the present invention begins with classifying a plurality of control regions depending on an engine load and an engine speed at step S100. The first to sixth control regions are indicated in FIG. 4 and FIG. 5.

The controller 30 may classify control regions as the first control region when the engine load is less than a first predetermined load, the second control region when the engine load is equal to or greater than the first predetermined load and less than a second predetermined load, and the third control region when the engine load is equal to or greater than the second predetermined load and less than a third predetermined load. In addition, the controller 30 may classify control regions as the fourth control region when the engine load is equal to or greater than the second predetermined load and the engine speed is equal to or greater than a first predetermined speed and less than a second predetermined speed, the fifth control region when the engine load is equal to or greater than the third predetermined load and the engine speed is less than the first predetermined speed, and the sixth control region when the engine load is equal to or greater than the third predetermined load and the engine speed is equal to or greater than the second predetermined speed.

Figure 4:
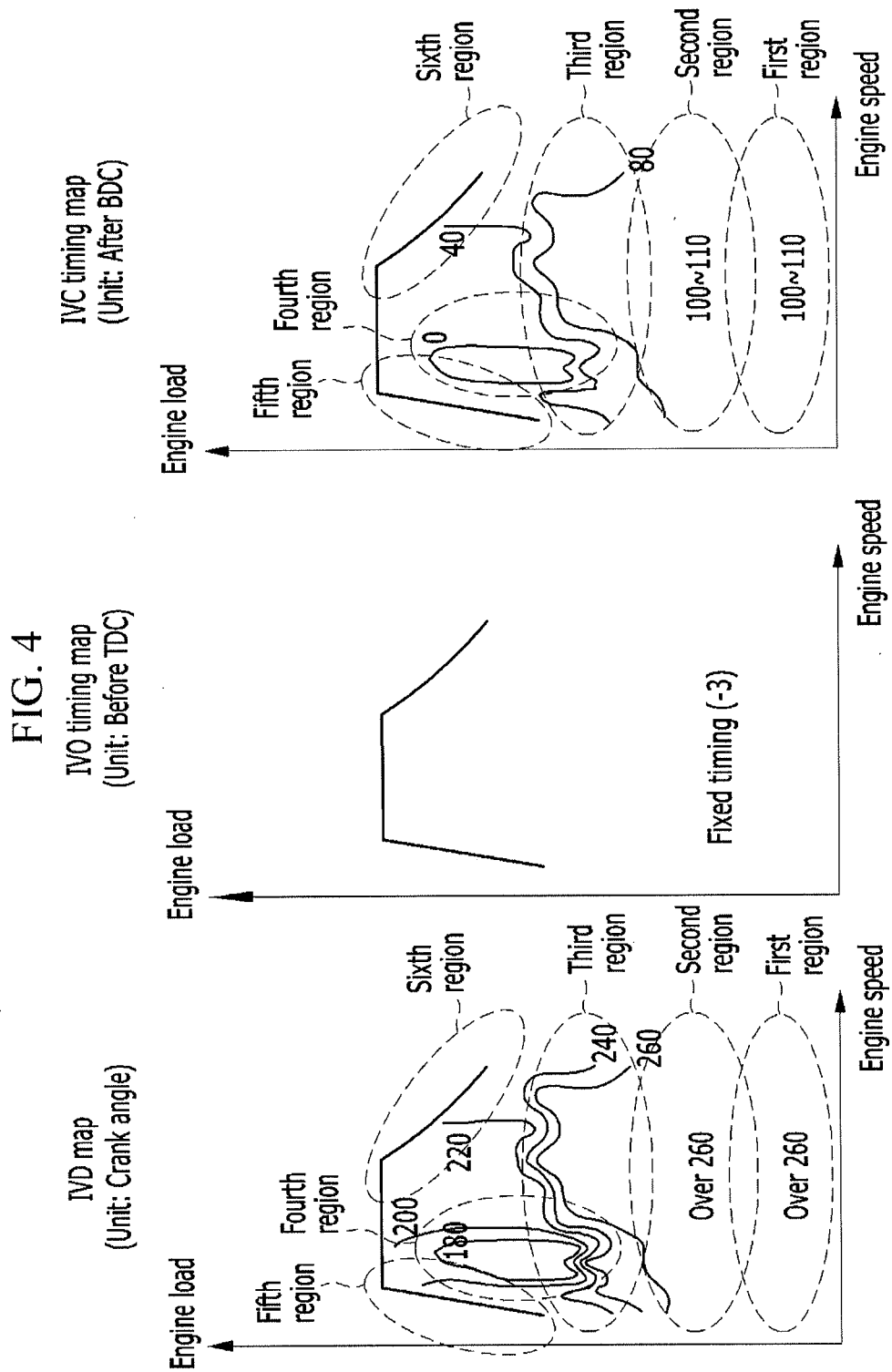
FIG. 4 is a graph showing duration, opening timing, and closing timing of an intake valve depending on an engine load and an engine speed according to various embodiments of the present invention.
Figure 5:
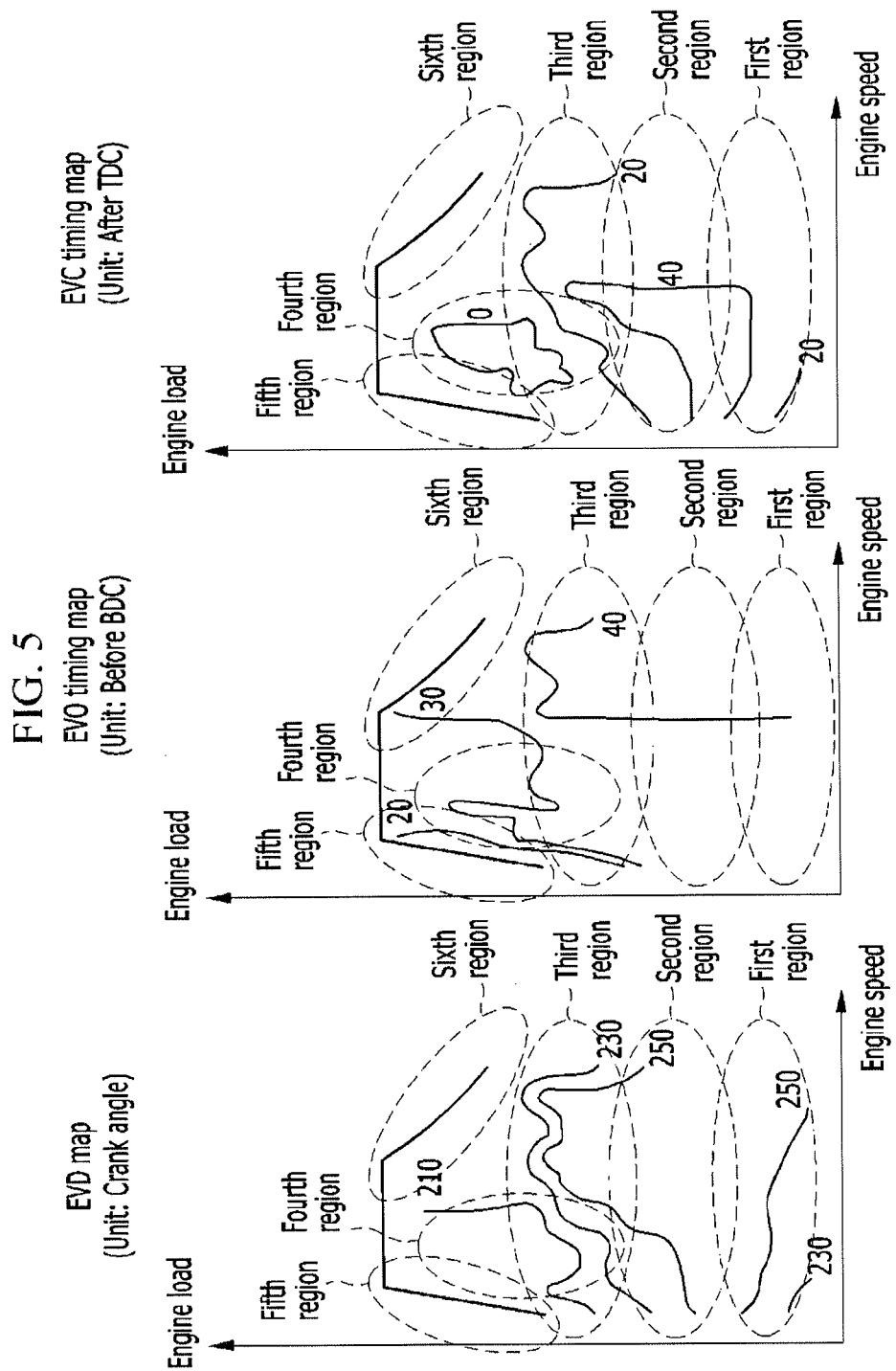
FIG. 5 is a graph showing duration, opening timing, and closing timing of an exhaust valve depending on an engine load and engine speed according to an exemplary embodiment of the present invention.

Meanwhile, as shown in FIG. 4 and FIG. 5, a crank angle is indicated in an intake valve duration (IVD) map and an exhaust valve duration (EVD) map. In addition, a unit of number designated in an intake valve opening (IVO) timing map is before top dead center (TDC), a unit of number designated an intake valve closing (IVC) timing map is after bottom dead center (BDC), a unit of number designated in an exhaust valve opening (EVO) timing map is before BDC, and a unit of number designated in an exhaust valve closing (EVC) timing map is after TDC. Regions and curved lines shown in FIG. 4 and FIG. 5 are just examples for describing various embodiments of the present invention, and various embodiments of the present invention are not limited thereto.

When the control regions are classified depending on the engine load and the engine speed at step S100, the controller 30 determines whether a current engine state belongs to the first control region at step S110.

When the engine load is less than the first predetermined load at step S110, the controller 30 determines that the current engine state belongs to the first control region. In this case, the controller 30 applies the maximum duration to the intake valve and limits the valve overlap between the exhaust valve and the intake valve at step S120. The valve overlap represents a state in which the intake valve is opened and the exhaust valve is not closed yet.

In other words, when the engine is operated at a low load condition, the controller 30 may fix the IVC timing to apply the maximum duration to the intake valve. As shown in FIG. 4, since the IVO timing is fixed in various embodiments of the present invention, the IVC timing may be fixed at an angle of 100 to 110 degrees after bottom dead center (BDC).

In addition, the controller 30 may fix the EVO timing and may set the EVC timing as a maximum value capable of maintaining combustion stability such that the valve overlap is limited. In this case, the EVO timing may be fixed at an angle of 40 to 50 degrees before BDC, and the EVC timing may be set as the maximum value capable of maintaining combustion stability by moving the EVC timing in an after TDC direction.

When the current engine state does not belong to the first control region at step S110, the controller 30 determines whether the current engine state belongs to the second control region at step S130.

When the engine load is equal to or greater than the first predetermined load and is less than the second predetermined load at step S130, the controller 30 determines that the current engine state belongs to the second control region. In this case, the controller 30 maintains the maximum duration of the intake valve at step S140.

The controller 30 may apply a maximum duration to the exhaust valve by retarding the EVC timing according to an increase of the engine load. Accordingly, the maximum duration of the intake valve being used in the first control region and the maximum duration of the exhaust valve may be used in the second control region.

When the current engine state does not belong to the second control region at step S130, the controller 30 determines whether the current engine state belongs to the third control region at step S150.

When the engine load is equal to or greater than the second predetermined load and is less than the third predetermined load, the controller 30 determines that the current engine state belongs to the third control region. In this case, the controller 30 advances the IVC timing and the EVC timing at step S160.

The IVC timing is controlled to the late intake valve close (LIVC) position (the angle of 100 to 110 degrees after BDC) in the first control region and the second control region. When the IVC timing is positioned at the LIVC position, as the engine load is increased, boost pressure may be increased, knocking may occur, and fuel efficiency may be deteriorated. In order to prevent the aforementioned phenomenon, the controller 30 advances the IVC timing in the third control region where the engine load is relatively large.

In this case, the controller 30 may rapidly advance the IVC timing to be close to BDC when the engine speed is less than a predetermined speed, and may slowly advance the IVC timing to an angle of 30 to 50 degrees after BDC when the engine speed is equal to or greater than the predetermined speed. The predetermined speed may be 1500 rpm.

In addition, since the EVC timing is positioned at maximum valve overlap in the second control region, the controller 30 may advance the EVC timing to be close to TDC.

When the current engine state does not belong to the third control region at step S150, the controller 30 determines whether the current engine state belongs to the fourth control region at step S170.

When the controller 30 determines that the current engine state belongs to the fourth control region at step S170, the controller 30 controls the IVC timing to be close to BDC at step S180.

The fourth control region may be a low boost region that the engine load is equal to or greater than the second predetermined load and the engine speed is equal to or greater than the first predetermined speed and less than the second predetermined speed. For example, the first predetermined speed may be 1500 rpm, and the second predetermined speed may be 2500 rpm.

When the IVC timing is close to BDC in the fourth control region, fuel efficiency may be improved. In addition, the controller 30 may control the EVC timing to be close to TDC so as to reduce the valve overlap. Since the IVO timing is fixed in various embodiments of the present invention, when the IVC timing is controlled to be close to BDC, the intake valve duration may be controlled as a short duration (e.g., 180 degrees).

When the current engine state does not belong to the fourth control region at step S170, the controller 30 determines whether the current engine state belongs to the fifth control region at step S190.

When the engine load is equal to or greater than the third predetermined load and the engine speed is less than the first predetermined speed at step S190, the controller 30 determines that the current engine sate belongs to the fifth control region. In this case, the controller 30 controls the throttle valve 60 to be fully opened and retards the EVO timing at step S200.

In the turbo engine, when the throttle valve 60 is fully opened (i.e., WOT; Wide Open Throttle) in the fifth control region that the engine speed is less than the first predetermined speed (e.g., 1500 rpm), intake port pressure may become higher than exhaust port pressure. Therefore, scavenging phenomenon occurs easily compared to a natural aspirated engine. However, since the IVO timing is fixed in various embodiments of the present invention, the scavenging phenomenon is not large. Accordingly, the EVO timing and the EVC timing may be used to complement the scavenging phenomenon through exhaust interference reduction. The controller 30 may retard the EVO timing after BDC to reduce the exhaust interference, and controls the EVC timing within an angle of 30 degrees after TDC to maintain catalyst temperature within a predetermined range. In this case, the controller 30 applies a short duration (e.g., 180 to 210 degrees) to the exhaust valve in the fifth control region.

When the current engine state does not belong to the fifth control region at step S190, the controller 30 determines whether the current engine state belongs to the sixth control region at step S210.

When the engine load is equal to or greater than the third predetermined load and the engine speed is equal to or greater than the second predetermined speed, the controller 30 determines that the current engine state belongs to the sixth control region. In this case, the controller 30 controls the throttle valve 60 to be fully opened, and controls the IVC timing to prevent knocking at step S220.

When the engine speed is equal to or greater than the second predetermined speed (e.g., 2500 rpm), since the exhaust port pressure is significantly greater than the intake port pressure, the scavenging phenomenon disappears. Accordingly, the controller 30 advances the EVO timing to an angle of 30 degrees before BDC and controls the EVC timing to be close to TDC to prevent exhaust pumping.

Meanwhile, when WOT control is performed at a high speed condition, the knocking hardly occurs in the natural aspirated engine, on the contrary, the knocking easily occurs in the turbo engine. Accordingly, the controller 30 advances the IVC timing within an angle of 50 degrees after BDC to reduce boost pressure such that knocking is prevented.

As described above, according to various embodiments of the present invention, duration and timing of the continuous variable valve are simultaneously controlled, so the engine may be controlled under optimum conditions.

Opening timing and closing timing of the intake valve and the exhaust valve are optimally controlled, thereby improving fuel efficiency under a partial load condition and power performance under a high load condition. In addition, a fuel amount for starting may be reduced by increasing a valid compression ratio, and exhaust gas may be reduced by shortening time for heating a catalyst.

Further, since a continuous variable valve timing device at the intake is omitted, production cost may be reduced with maintaining power performance.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling valve timing of a turbo engine provided with a continuous variable valve duration (CVVD) device at an intake and a continuous variable valve duration (CVVD) device and a continuous variable valve timing (CVVT) device at an exhaust, the method comprising:
    classifying, by a controller, a plurality of control regions depending on an engine load and an engine speed;
    applying, by the controller, a maximum duration to an intake valve and controlling a valve overlap between an exhaust valve and the intake valve in a first control region;
    maintaining, by the controller, the maximum duration of the intake valve in a second control region;
    advancing, by the controller, an intake valve closing (IVC) timing and an exhaust valve closing (EVC) timing in a third control region;
    controlling, by the controller, the IVC timing to be close to bottom dead center (BDC) in a fourth control region;
    controlling, by the controller, a throttle valve to be fully opened and retarding an exhaust valve opening (EVO) timing in a fifth control region; and
    controlling, by the controller, the throttle valve to be fully opened and controlling the IVC timing to prevent knocking in a sixth control region.

2. The method of claim 1, wherein the EVC timing is set as a maximum value for maintaining combustion stability in the first control region.

3. The method of claim 1, wherein a maximum duration is applied to the exhaust valve by retarding the EVC timing according to an increase of the engine load in the second control region.

4. The method of claim 1, wherein the IVC timing is advanced to be close to BDC when the engine speed is less than a predetermined speed and the IVC timing is advanced to an angle after BDC when the engine speed is equal to or greater than the predetermined speed in the third control region.

5. The method of claim 1, wherein the IVC timing is controlled to be closed to BDC and the EVC timing is controlled to be close to top dead center (TDC) in the fourth control region.

6. The method of claim 1, wherein the EVO timing is retarded after BDC and the EVC timing is controlled to an angle after top dead center (TDC) to maintain catalyst temperature within a predetermined range in the fifth control region.

7. The method of claim 1, wherein the EVO timing is advanced and the EVC timing is controlled to be close to top dead center (TDC) in the sixth control region.

8. A system for controlling valve timing of a continuous variable valve duration engine including a turbocharger, the system comprising:
   a data detector detecting data related to a running state of a vehicle;
   a camshaft position sensor detecting a position of a camshaft;
   an intake continuous variable valve duration (CVVD) device controlling an opening time of an intake valve of the engine;
   an exhaust continuous variable valve duration (CVVD) device controlling an opening time of an exhaust valve of the engine;
   an exhaust continuous variable valve timing (CVVT) device controlling an opening timing and closing timing of the exhaust valve; and
   a controller classifying a plurality of control regions depending on an engine speed and an engine load based on signals received by the controller from the data detector and the camshaft position sensor, and controlling operations of the intake CVVD device and the exhaust CVVD device, and the exhaust CVVT device according to the control regions,
   wherein the controller:
      applies a maximum duration to the intake valve and controls a valve overlap between the exhaust valve and the intake valve in a first control region;
      maintains the maximum duration of the intake valve in a second control region;
      advances an intake valve closing (IVC) timing and an exhaust valve closing (EVC) timing in a third control region;
      controls the IVC timing to be close to bottom dead center (BDC) in a fourth control region;
      controls a throttle valve to be fully opened and retards an exhaust valve opening (EVO) timing in a fifth control region; and
      controls the throttle valve to be fully opened and controls the IVC timing to prevent knocking in a sixth control region.

9. The system of claim 8, wherein the controller sets the EVC timing as a maximum value configured for maintaining combustion stability in the first control region.

10. The system of claim 8, wherein the controller applies a maximum duration to the exhaust valve by retarding the EVC timing according to an increase of the engine load in the second control region.

11. The system of claim 8, wherein the controller advances the IVC timing to be close to BDC when the engine speed is less than a predetermined speed and advances the IVC timing to an angle after BDC when the engine speed is equal to or greater than the predetermined speed in the third control region.

12. The system of claim 8, wherein the controller controls the IVC timing to be close to BDC and controls the EVC timing to be close to top dead center (TDC) in the fourth control region.

13. The system of claim 8, wherein the controller retards the EVO timing after BDC and controls the EVC timing to an angle after top dead center (TDC) to maintain catalyst temperature within a predetermined range in the fifth control region.

14. The system of claim 8, wherein the controller advances the EVO timing and controls the EVC timing to be close to top dead center (TDC) in the sixth control region.

* * * * *